United States Patent
Sridharan et al.

(10) Patent No.: US 10,904,231 B2
(45) Date of Patent: Jan. 26, 2021

(54) ENCRYPTION USING MULTI-LEVEL ENCRYPTION KEY DERIVATION

(71) Applicant: Microsoft Technology Licensing, LLC, Redmond, WA (US)

(72) Inventors: Baskar Sridharan, Sammamish, WA (US); Victor V. Boyko, Brooklyn, NY (US); Sriram K. Rajamani, Bangalore (IN); Mitica Manu, Sammamish, WA (US)

(73) Assignee: MICROSOFT TECHNOLOGY LICENSING, LLC, Redmond, WA (US)

(*) Notice: Subject to any disclaimer, the term of this patent is extended or adjusted under 35 U.S.C. 154(b) by 91 days.

(21) Appl. No.: 15/617,935

(22) Filed: Jun. 8, 2017

(65) Prior Publication Data
US 2018/0287789 A1    Oct. 4, 2018

(30) Foreign Application Priority Data
Mar. 31, 2017    (IN) .............................. 201741011742

(51) Int. Cl.
*H04L 29/06*    (2006.01)
*G06F 21/60*    (2013.01)
(Continued)

(52) U.S. Cl.
CPC .......... *H04L 63/06* (2013.01); *G06F 12/1408* (2013.01); *G06F 21/602* (2013.01);
(Continued)

(58) Field of Classification Search
CPC ..... H04L 63/06; H04L 9/0861; H04L 63/064; H04L 63/0428; H04L 63/0884;
(Continued)

(56) References Cited

U.S. PATENT DOCUMENTS 8,285,993 B1    10/2012    Subramanian et al.
8,731,203 B2    5/2014    D'souza
(Continued)

OTHER PUBLICATIONS

Lily Chen, "NIST Special Publication 800-108, Recommendation for Key Derivation Using Pseudorandom Functions", Oct. 2009, 21 pages (Year: 2009).*

(Continued)

*Primary Examiner* — Chau Le
*Assistant Examiner* — Han Yang
(74) *Attorney, Agent, or Firm* — Workman Nydegger

(57) ABSTRACT

Data may be encrypted using a derived block encryption key for each of at least one append blocks of data. A data operation associated with manipulating particular data associated with a user may be received. The particular data may comprise at least one append block of data. In response to the received data operation, for each append block of data of the at least one append block of data, parameters associated with deriving a block encryption key for a given append block of data of the at least one append block of data may be accessed. The parameters may comprise at least a data encryption key associated with the user and a nonce. A block encryption key may be derived for the given append block of data utilizing the parameters. The given append block of data may be encrypted utilizing the block encryption key.

18 Claims, 4 Drawing Sheets

(51) Int. Cl.
  *G06F 21/62* (2013.01)
  *G06F 12/14* (2006.01)
  *H04L 9/08* (2006.01)
  *H04L 9/06* (2006.01)
(52) U.S. Cl.
  CPC ........ *G06F 21/6281* (2013.01); *H04L 9/0861* (2013.01); *H04L 63/0428* (2013.01); *H04L 63/064* (2013.01); *G06F 2212/1052* (2013.01); *H04L 9/0618* (2013.01); *H04L 63/0884* (2013.01)
(58) Field of Classification Search
  CPC ............... H04L 9/0618; G06F 12/1408; G06F 2212/1052; G06F 21/62; G06F 21/602; G06F 21/6281
  See application file for complete search history.

(56) References Cited

U.S. PATENT DOCUMENTS

| | | | |
|---|---|---|---|
| 8,949,591 B2 | 2/2015 | Ovsiannikov | |
| 9,002,018 B2 | 4/2015 | Rehman et al. | |
| 9,154,488 B2 | 10/2015 | Innes et al. | |
| 9,197,410 B2 | 11/2015 | Yoshida et al. | |
| 9,294,479 B1 | 3/2016 | Koulomzin | |
| 9,344,276 B2 | 5/2016 | Kawai et al. | |
| 10,043,029 B2 | 8/2018 | Murray | |
| 10,484,352 B2 | 11/2019 | Manu et al. | |
| 2010/0098255 A1* | 4/2010 | Ciet | H04L 9/0838 380/277 |
| 2010/0198730 A1 | 8/2010 | Ahmed et al. | |
| 2014/0192979 A1 | 7/2014 | Dondeti | |
| 2015/0172271 A1 | 6/2015 | Barrows et al. | |
| 2018/0349631 A1* | 12/2018 | Illendula | G06F 15/16 |
| 2020/0067896 A1 | 2/2020 | Manu et al. | |

OTHER PUBLICATIONS

Al-Khalifa, et al., "Multi-level operator combination in XML query processing", In Proceedings of the eleventh international conference on Information and knowledge management, Nov. 4, 2002, 8 pages.
"Non Final Office Action Issued in U.S. Appl. No. 15/616,392", dated Mar. 7, 2019, 6 Pages.
"Non-Final Office Action Issued in U.S. Appl. No. 16/670,946", dated Jul. 31, 2020, 8 Pages.

* cited by examiner

ENCRYPTION USING MULTI-LEVEL ENCRYPTION KEY DERIVATION

BACKGROUND

Computer systems and related technology affect many aspects of society. Indeed, the computer system's ability to process information has transformed the way we live and work. Computer systems now commonly perform a host of tasks (e.g., word processing, scheduling, accounting, etc.) that prior to the advent of the computer system were performed manually. More recently, computer systems have been coupled to one another and to other electronic devices to form both wired and wireless computer networks over which the computer systems and other electronic devices can transfer electronic data. As such, the performance of many computing tasks has become distributed across a number of different computer systems and/or a number of different computer environments.

For instance, there has been an increasing transition, with respect to both hardware and software, from on-premises to cloud based solutions. Vast amounts of data relating to such cloud-based solutions are generated, transferred, and shared each minute of each day. As such, opportunities for potential attackers to access or modify data belonging to others may be proportionately large. Even when data is encrypted, attackers may find ways to access the encrypted data. For instance, attackers may obtain a user's encryption key by hacking the user or by using a social engineering attack.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

At least some embodiments described herein relate to encrypting data using a derived block encryption key for each of at least one append blocks of data. For example, embodiments may include receiving a data operation associated with manipulating particular data associated with a user. The particular data may comprise at least one append block of data. In response to the received data operation, for each append block of data of the at least one append block of data, a number of actions may be performed. For instance, embodiments may further include accessing parameters associated with deriving a block encryption key for a given append block of data of the at least one append block of data. The parameters may comprise at least a data encryption key associated with the user and a nonce. Embodiments may further include deriving a block encryption key for the given append block of data utilizing the parameters. Embodiments may further include encrypting the given append block of data utilizing the block encryption key.

In this way, a block encryption key (BEK) may be generated that can greatly improve security of data (e.g., data stored within a data lake service), while keeping performance (e.g., of the data lake service) high. Additionally, generating BEK's in this way may allow for decoupling customer keys (e.g., DEK's) used for deriving encryption keys and system keys (e.g., BEK's) that are used for performing the actual encryption. Decoupling customer keys and system keys may allow for greater protection of keys (e.g., the MEK, the DEK, and the BEK), while also allowing for greater protection of encrypted data.

Furthermore, BEK's may be discarded after use, thus making it even more difficult for an attacker to gain access to encryption keys (i.e., BEK's), as an attacker would have to be able to derive encryption keys. Randomly generated nonces that are used as inputs for deriving encryption keys may further allow for greater protection against an attacker being able to derive encryption keys. Finally, encryption and key derivation, as described herein, may be performed in either hardware or software, thus allowing the principles described herein to be implemented in a wide range of environments.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

Figure 1:
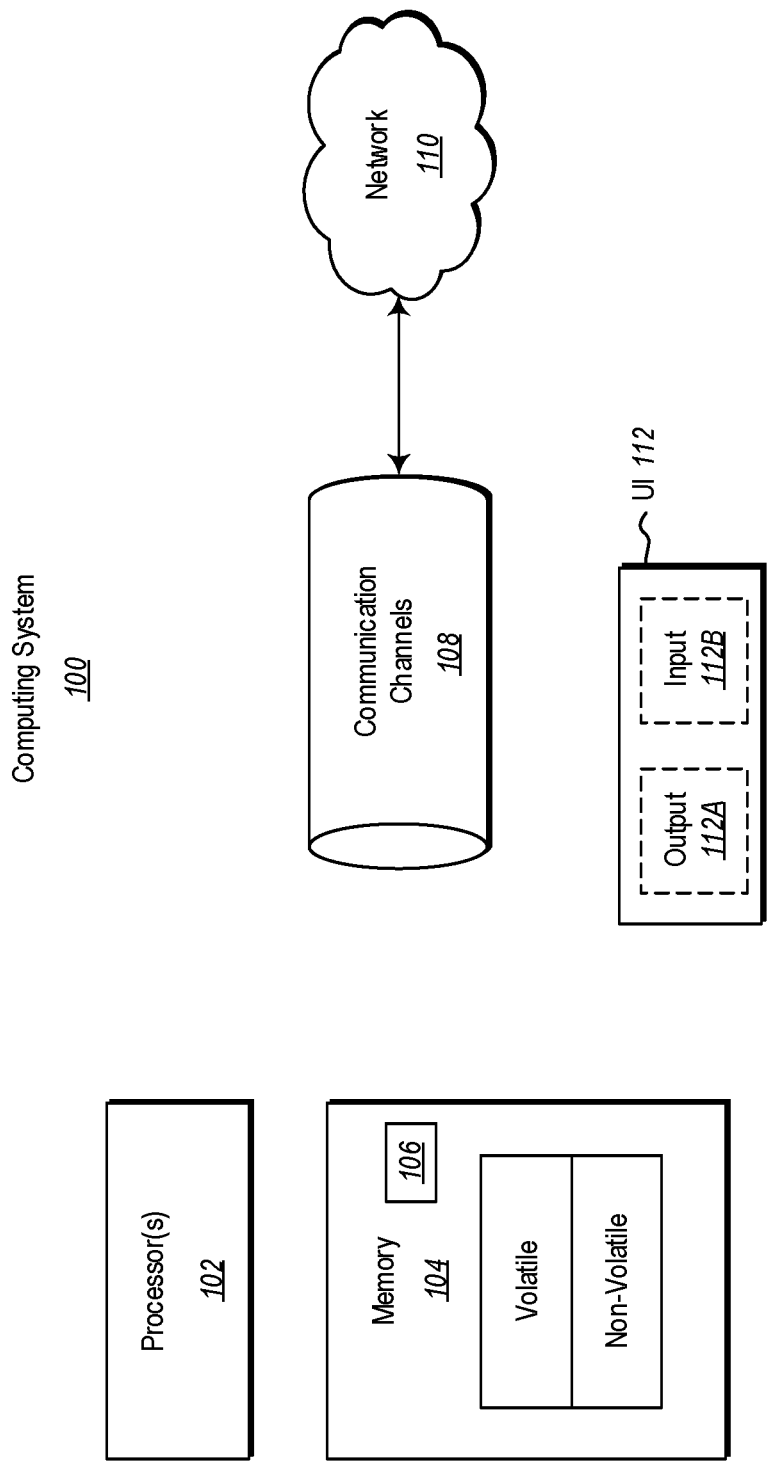
FIG. 1 illustrates an example computer architecture that facilitates operation of the principles described herein.

At least some embodiments described herein relate to encrypting data using a derived block encryption key for each of at least one append blocks of data. For example, embodiments may include receiving a data operation associated with manipulating particular data associated with a user. The particular data may comprise at least one append block of data. In response to the received data operation, for each append block of data of the at least one append block of data, a number of actions may be performed. For instance, embodiments may further include accessing parameters associated with deriving a block encryption key for a given append block of data of the at least one append block of data. The parameters may comprise at least a data encryption key associated with the user and a nonce. Embodiments may further include deriving a block encryption key for the given append block of data utilizing the parameters. Embodiments may further include encrypting the given append block of data utilizing the block encryption key.

In this way, a BEK (block encryption key) may be generated that can greatly improve security of data (e.g., data stored within a data lake service), while keeping performance (e.g., of the data lake service) high. Additionally, generating BEK's in this way may allow for decoupling customer keys (e.g., DEK's) used for deriving encryption keys and system keys (e.g., BEK's) that are used for performing the actual encryption. Decoupling customer keys and system keys may allow for greater protection of both keys (i.e., both the DEK and the BEK), while also allowing for greater protection of encrypted data.

Furthermore, BEK's may be discarded after use, thus making it even more difficult for an attacker to gain access to encryption keys (i.e., BEK's), as an attacker would have to be able to derive encryption keys. Randomly generated nonces that are used as inputs for deriving encryption keys may further allow for greater protection against an attacker being able to derive encryption keys. Finally, encryption and key derivation, as described herein, may be performed in either hardware or software, thus allowing the principles described herein to be implemented in a wide range of environments.

Some introductory discussion of a computing system will be described with respect to FIG. 1. Then encrypting data using a derived block encryption key for each of at least one append blocks of data will be described with respect to FIGS. 2 through 4.

Computing systems are now increasingly taking a wide variety of forms. Computing systems may, for example, be handheld devices, appliances, laptop computers, desktop computers, mainframes, distributed computing systems, datacenters, or even devices that have not conventionally been considered a computing system, such as wearables (e.g., glasses). In this description and in the claims, the term "computing system" is defined broadly as including any device or system (or combination thereof) that includes at least one physical and tangible processor, and a physical and tangible memory capable of having thereon computer-executable instructions that may be executed by a processor. The memory may take any form and may depend on the nature and form of the computing system. A computing system may be distributed over a network environment and may include multiple constituent computing systems.

As illustrated in FIG. 1, in its most basic configuration, a computing system 100 typically includes at least one hardware processing unit 102 and memory 104. The memory 104 may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well.

The computing system 100 also has thereon multiple structures often referred to as an "executable component". For instance, the memory 104 of the computing system 100 is illustrated as including executable component 106. The term "executable component" is the name for a structure that is well understood to one of ordinary skill in the art in the field of computing as being a structure that can be software, hardware, or a combination thereof. For instance, when implemented in software, one of ordinary skill in the art would understand that the structure of an executable component may include software objects, routines, methods, and so forth, that may be executed on the computing system, whether such an executable component exists in the heap of a computing system, or whether the executable component exists on computer-readable storage media.

In such a case, one of ordinary skill in the art will recognize that the structure of the executable component exists on a computer-readable medium such that, when interpreted by one or more processors of a computing system (e.g., by a processor thread), the computing system is caused to perform a function. Such structure may be computer-readable directly by the processors (as is the case if the executable component were binary). Alternatively, the structure may be structured to be interpretable and/or compiled (whether in a single stage or in multiple stages) so as to generate such binary that is directly interpretable by the processors. Such an understanding of example structures of an executable component is well within the understanding of one of ordinary skill in the art of computing when using the term "executable component".

The term "executable component" is also well understood by one of ordinary skill as including structures that are implemented exclusively or near-exclusively in hardware, such as within a field programmable gate array (FPGA), an application specific integrated circuit (ASIC), or any other specialized circuit. Accordingly, the term "executable component" is a term for a structure that is well understood by those of ordinary skill in the art of computing, whether implemented in software, hardware, or a combination. In this description, the terms "component", "service", "engine", "module", "control", or the like may also be used. As used in this description and in the case, these terms (whether expressed with or without a modifying clause) are also intended to be synonymous with the term "executable component", and thus also have a structure that is well understood by those of ordinary skill in the art of computing.

In the description that follows, embodiments are described with reference to acts that are performed by one or more computing systems. If such acts are implemented in software, one or more processors (of the associated computing system that performs the act) direct the operation of the computing system in response to having executed computer-executable instructions that constitute an executable component. For example, such computer-executable instructions may be embodied on one or more computer-readable media that form a computer program product. An example of such an operation involves the manipulation of data.

The computer-executable instructions (and the manipulated data) may be stored in the memory 104 of the computing system 100. Computing system 100 may also contain communication channels 108 that allow the computing system 100 to communicate with other computing systems over, for example, network 110.

While not all computing systems require a user interface, in some embodiments, the computing system 100 includes a user interface 112 for use in interfacing with a user. The user interface 112 may include output mechanisms 112A as well as input mechanisms 112B. The principles described herein are not limited to the precise output mechanisms 112A or input mechanisms 112B as such will depend on the nature of the device. However, output mechanisms 112A might include, for instance, speakers, displays, tactile output, holograms and so forth. Examples of input mechanisms 112B might include, for instance, microphones, touchscreens, holograms, cameras, keyboards, mouse of other pointer input, sensors of any type, and so forth.

Embodiments described herein may comprise or utilize a special purpose or general-purpose computing system including computer hardware, such as, for example, one or more processors and system memory, as discussed in greater detail below. Embodiments described herein also include physical and other computer-readable media for carrying or storing computer-executable instructions and/or data structures. Such computer-readable media can be any available media that can be accessed by a general purpose or special purpose computing system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: storage media and transmission media.

Computer-readable storage media includes RAM, ROM, EEPROM, CD-ROM or other optical disk storage, magnetic disk storage or other magnetic storage devices, or any other physical and tangible storage medium which can be used to store desired program code means in the form of computer-executable instructions or data structures and which can be accessed by a general purpose or special purpose computing system.

A "network" is defined as one or more data links that enable the transport of electronic data between computing systems and/or modules and/or other electronic devices. When information is transferred or provided over a network or another communications connection (either hardwired, wireless, or a combination of hardwired or wireless) to a computing system, the computing system properly views the connection as a transmission medium. Transmissions media can include a network and/or data links which can be used to carry desired program code means in the form of computer-executable instructions or data structures and which can be accessed by a general purpose or special purpose computing system. Combinations of the above should also be included within the scope of computer-readable media.

Further, upon reaching various computing system components, program code means in the form of computer-executable instructions or data structures can be transferred automatically from transmission media to storage media (or vice versa). For example, computer-executable instructions or data structures received over a network or data link can be buffered in RAM within a network interface module (e.g., a "NIC"), and then eventually transferred to computing system RAM and/or to less volatile storage media at a computing system. Thus, it should be understood that storage media can be included in computing system components that also (or even primarily) utilize transmission media.

Computer-executable instructions comprise, for example, instructions and data which, when executed at a processor, cause a general purpose computing system, special purpose computing system, or special purpose processing device to perform a certain function or group of functions. Alternatively, or in addition, the computer-executable instructions may configure the computing system to perform a certain function or group of functions. The computer executable instructions may be, for example, binaries or even instructions that undergo some translation (such as compilation) before direct execution by the processors, such as intermediate format instructions such as assembly language, or even source code.

Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computing system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, datacenters, wearables (such as glasses) and the like. The invention may also be practiced in distributed system environments where local and remote computing systems, which are linked (either by hardwired data links, wireless data links, or by a combination of hardwired and wireless data links) through a network, both perform tasks. In a distributed system environment, program modules may be located in both local and remote memory storage devices.

Those skilled in the art will also appreciate that the invention may be practiced in a cloud computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

Figure 2:
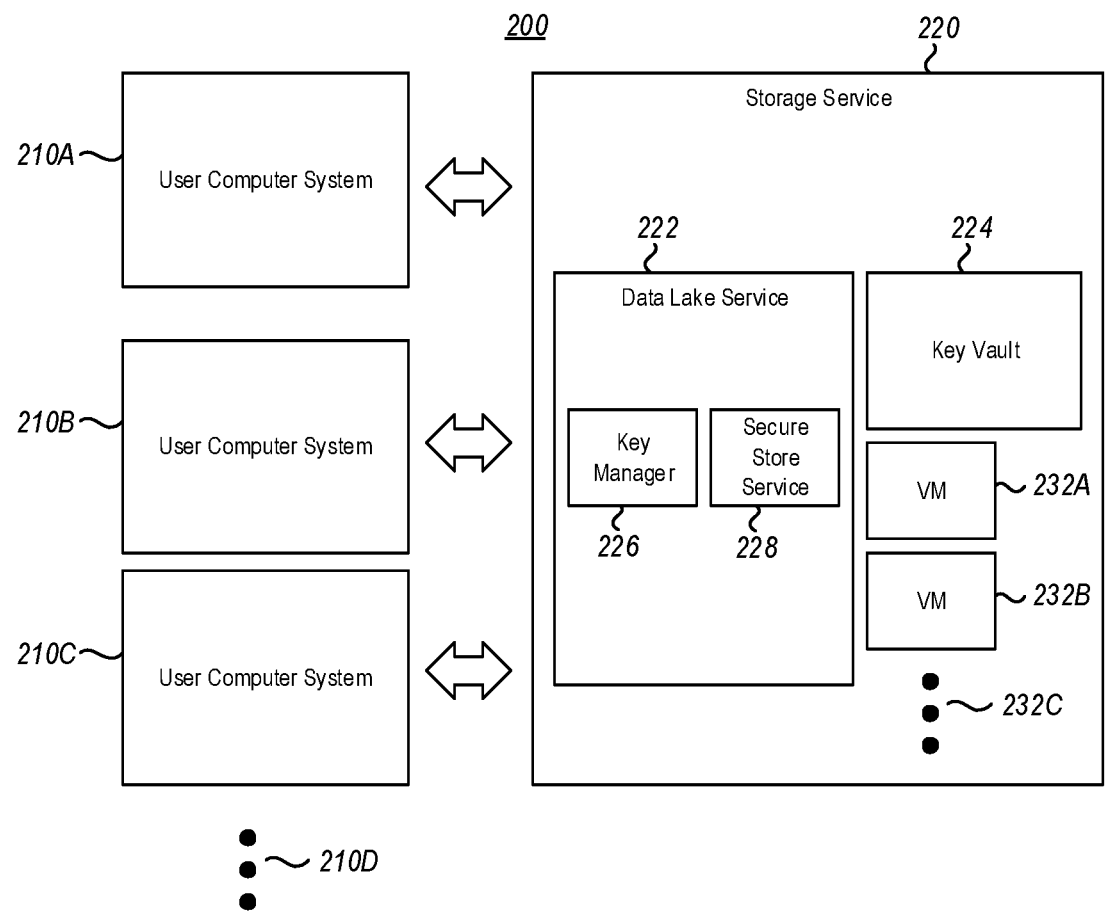
FIG. 2 illustrates an example environment for encrypting data using a derived block encryption key for each of at least one append blocks of data.

FIG. 2 illustrates a computer environment 200 for generating a block encryption key for encrypting or decrypting append blocks of data, as further described herein. As illustrated, FIG. 2 includes user computer system 210A, user computer system 210B, user computer system 210C (collectively referred to herein as the user computer systems 210), and a storage service 220 that comprises at least a data lake service 222 and a key vault 224. Each of the user computer systems 210 and the storage service 220 may correspond to the computer system 100, as described with respect to FIG. 1.

For instance, the user computer systems 210 may comprise a desktop computer, a laptop computer, a tablet, a smartphone, and so forth. Furthermore, the user computer system 210A may be running any applicable operating system, including but not limited to, MICROSOFT® WINDOWS®, APPLE® MACOS®, IOS®, GOOGLE™ CHROME OS™, and so forth. While only three user computer systems 210 are illustrated (i.e., user computer system 210A, user computer system 210B, and user computer system 210C), ellipses 210D illustrates that any number of user computer systems 210 may be used when practicing the principles described herein. Notably, the principles described herein may be practiced using hundreds of thousands of user computer systems, millions of user computer systems, and so forth.

As briefly mentioned, the computer environment 200 includes the storage service 220. In some embodiments, the storage service 220 may comprise a cloud computer service. For instance, the storage service 220 may comprise MICROSOFT AZURE®, AMAZON WEB SERVICES® (AWS), GOOGLE CLOUD PLATFORM™, and so forth. As briefly described, the storage service 220 includes a data lake service 222 that includes a key manager 226 and a secure store service 228. Notably, while the storage service 220 is illustrated and discussed specifically herein as including a data lake service, the principles described herein may also be practiced with respect to any other applicable type of storage services (e.g., backup storage services, binary large object (BLOB) storage, and so forth). The data lake service 222 may comprise a data storage service that is capable of storing data in essentially any data format. For example, the data lake service may be configured to store data that comprises binary data (e.g., audio, images, video, binary large objects (BLOB's), structured data (e.g., in the form of a relational database), semi-structured data (e.g., extensible markup language (XML)), unstructured data (e.g., documents, emails), and so forth.

Accordingly, user data (i.e., data associated with the user computer systems 210) may be stored within the data lake service 222. Such user data may be stored as a stream, which is a basic unit of storage of user information/data. Each stream may comprise a collection of partitions that are referred to herein as extents (i.e., a stream is comprised of a collection of extents). Each extent may have a unique identifier that allows any given extent to be identified. For instance, each extent may be uniquely identified with a globally unique identifier (GUID), as further described herein. Notably, the unique identifier of an extent may not change during a lifetime of the extent. Furthermore, each extent may comprise a collection of append blocks, which append blocks may comprise a single, smallest unit of data that can be written/stored in an atomic operation in the data lake service 222. Notably, each extent may comprise up to around a few hundred megabytes in size, while an append block may comprise up to around four megabytes in size. In some embodiments, the data lake service 222 may comprise an append-only storage service, such that append is the only write operation allowed with respect to a given stream/extent (data blocks can only be appended rather than allowing for deleting and/or modifying previously written data blocks).

As illustrated, the storage service 220 also includes key vault 224. The key vault may include a master encryption key (MEK) for each user (e.g., user account) of the storage service 220. The MEK of a given user may be configured to encrypt/decrypt and authenticate (i.e., sign) a key referred to herein as a data encryption key (DEK) of the given user, as further described herein. Notably, in some embodiments, the key vault may include both an MEK and a master signing key (MSK) for each user, such that the MEK is configured to encrypt/decrypt the DEK, while the MSK is configured to authenticate the DEK. In other embodiments, the MEK may be configured to perform both encryption/decryption and authentication of a given DEK. Regardless of whether both an MEK and an MSK are used, DEK's may be encrypted/decrypted by the key vault (using the MEK/MSK) and may be stored in an encrypted and authenticated form by either the key manager 226 or the key vault.

Encryption and authentication of the DEK's (i.e., using the MEK/MSK) may be done using any encryption type/key type, including asymmetric encryption (i.e., using asymmetric keys) and symmetric encryption. For instance, RSA encryption (i.e., an asymmetric key type) and signatures may be used for both encryption and authentication purposes. In a more specific example, such RSA keys may comprise any appropriate length of bits (e.g., 2048 bits), while such RSA signature may employ any appropriate hash function (e.g., SHA-256, SHA-384, or SHA-512).

Encryption of the DEK's may also be performed using any appropriate encryption algorithm. In a particular example, the advanced encryption algorithm (AES) (e.g., AES encryption in cipher block chaining (CBC) mode) may be used. As briefly suggested, each user (e.g., user account) may also be provided a DEK. The DEK for a given user may be generated/stored by the key manager 226, and provided to the given user upon creation of an account with the data lake service 222. Notably, the DEK may be used for indirectly encrypting/decrypting data of a given user. More specifically, the DEK may be used to derive keys that are capable of encrypting/decrypting user data, as further described herein.

While numerous specific examples of encryption types, encryption schemes, hash functions, and so forth, have been described with respect to the DEK, any type of applicable encryption types, encryption schemes, hash functions, and so forth may be used. Regardless of the way in which a given DEK is encrypted, a resulting package of the encryption of the given DEK may include at least a header that includes a format version of the DEK package (or a format version of the header), algorithm identifiers that identify the algorithms that will be used to derive an encryption key (e.g., a BEK) based on the DEK, possibly also identifiers of the algorithms that will be used to encrypt data using the BEK, and an identification of the given DEK. More specifically, the header of the resulting package may include an identification of the intended algorithm of the DEK along with the parameters to be used in conjunction with the algorithm (e.g., this given DEK will be used to derive 256-bit AES-GCM keys utilizing the NIST SP800-108 key derivation function). Notably, the intended algorithm may be determined by the data lake service, in which case the intended algorithm may not be specified within the resulting package header.

As illustrated, the storage service 220 also includes virtual machine 232A and virtual machine 232B. While only two virtual machines 232 (i.e., virtual machine 232A and virtual machine 232B) are illustrated, ellipses 232C represents that any number of virtual machines 232 may be utilized by the storage service 220. Notably, while the virtual machines 232 are illustrated as being generally included within the storage service 220, in some embodiments, the virtual machines 232 may be included specifically within the data lake service 222. The virtual machines 232 may be configured to run user jobs (e.g., read requests, write requests, and so forth). However, in some embodiments, the virtual machines 232 may not have direct access to data stored within the data lake service 222. In such embodiments, all read/write requests from users may be sent from a virtual machine to the secure store service 228, which secure store service is configured to access data stored within the data lake service. Notably, portions of the key manager 226 and the secure store service may comprise trusted modules (e.g., a hardware security module, trusted software module, and so forth) that perform particular predetermined operations in a trusted, secure manner. Such trusted modules may be implemented in software and/or hardware.

In an example, assume that the virtual machine 232A has received a request to write data for a particular user. In response, the virtual machine may send the request to write data to the secure store service. The request sent from the virtual machine to the secure store service may include the data to be written, an identification of the stream on which the data is to be written, and any other applicable information. The secure store service may then send the data to be written to the TSM. The TSM may then perform any appropriate compression and encryption of the data (i.e., the encryption of data using a derived block encryption key (BEK), as further described herein).

As briefly described, the DEK may not be used to actually encrypt data, but may instead be used to derive a block encryption key (BEK) that is capable of encrypting data of a particular append block, as described further herein. In this way, customer keys (i.e., DEK and MEK) may be decoupled from system keys (i.e., BEK) used to encrypt data, thus allowing for greater protection of keys and encrypted data.

In some embodiments, it may be advantageous to utilize an encryption scheme for performing encryption using the BEK that is both ADVANCED ENCRYPTION STANDARD (AES) based and highly parallelizable. For instance, in such embodiments, such an encryption scheme may comprise AES in Galois Counter Mode (GCM). GCM may both provide confidentiality and protect the integrity of data. Additionally, GCM can authenticate additional authenticated data (AAD), which AAD comprises additional data that is not encrypted, but is still authenticated.

Furthermore, in such embodiments, it may be advantageous to utilize a key derivation function (i.e., the function used to derive encryption/decryption keys from the DEK, as further described herein) that is standards-based. In an example, the National Institute of Standards and Technology (NIST) SP800-108 key derivation function may be used, as the NIST SP800-108 is both standards-based and available in CNG. NIST SP800-108 may be used with any cryptographic hash function (e.g., Secure Hash Algorithm (SHA)-256, SHA-384, SHA-512, and so forth). While specific encryption schemes, key derivation functions, and so forth, have been discussed herein, any applicable encryption schemes, key derivation functions, and so forth may be utilized.

Notably, when using AES in GCM as the encryption scheme, one option is to use the same key for all append blocks, and vary nonces that are supplied to the AES-GCM algorithm. Such nonces do not have to be secret, but a given nonce does have to be unique. In other words, security of data when using GCM depends on an assumption that no nonce will be used more than once for a given key. If a nonce is ever reused twice in conjunction with the same key with respect to two different particular data items (e.g., data within two different append blocks), the confidentiality of the two data items can be lost. GCM nonces may be fixed at 96 bits long (e.g., when using CNG), which also coincides with the recommended length of NIST SP800-108.

The standard specified by NIST includes two options for generating nonces, deterministically generated nonces or randomly generated nonces, which are each generated per extent (i.e., resulting in encryption/decryption keys derived per extent). Notably, because such nonces are generated per extent, encryption/decryption keys would also be derived per extent. Deterministic nonces are generated using some form of a state (e.g., for which particular append block is the nonce being generated) to ensure that nonces are not repeated. Random nonces are generated at random for each append block. Both of these nonce generation approaches (i.e., deterministic and random), when using secure hardware (e.g., field programmable gate array (FPGA) boards), may present some challenges.

For instance, with respect to deterministic nonce generation, nonces would be likely supplied by software. However, secure hardware (e.g., CATAPULT FPGA boards) may not have persistent, non-volatile storage to track nonces (i.e., to ensure that no collisions of nonces occur, that is where a nonce is repeated). Accordingly, an attacker may subvert the software and reuse append block numbers to compromise security of the storage system. On the other hand, with respect to randomly generated nonces, an attacker can repeatedly query the secure hardware to encrypt data, until a nonce collision (i.e., a repeat nonce) occurs. Notably, more than 232 encryptions per key is against NIST rules, whereas using $2^{48}$ encryptions per key may be very likely to result in a nonce collision. Once a collision has occurred, an attacker may be capable of forging signatures.

While one type of nonces are nonces that are provided to the AES-GCM algorithm, as described above, another type of nonce, called a key derivation nonce, may be utilized such that encryption keys may be derived per append block (i.e., a derived block encryption key, or BEK). More specifically, a random nonce (also referred to herein as a random key derivation nonce) may be generated, and used in combination with a given extent GUID (or other unique identifier for a given extent) to derive a block key from a DEK of a given user, as further described herein.

In an example, utilizing a 128-bit nonce may allow for $2^{48}$ append blocks per extent, while utilizing a 160-bit nonce may allow for $2^{64}$ append blocks per extent. Accordingly, nonces of 160 bits or more may be advantageous, as generated nonces of at least 160 bits may be much less likely to result in nonce collisions (i.e. nonce repeats). For instance, nonces of 256 bits may also be generated and utilized. Notably, such nonces may be stored in a header of a given append block. While particular standards and examples have been described with respect to encryption, key derivation, and generating nonces, each associated with the BEK, these examples and standards have been described for example purposes only. As such, any number of applicable standards and examples may be practiced using the principles described herein.

Figure 3:
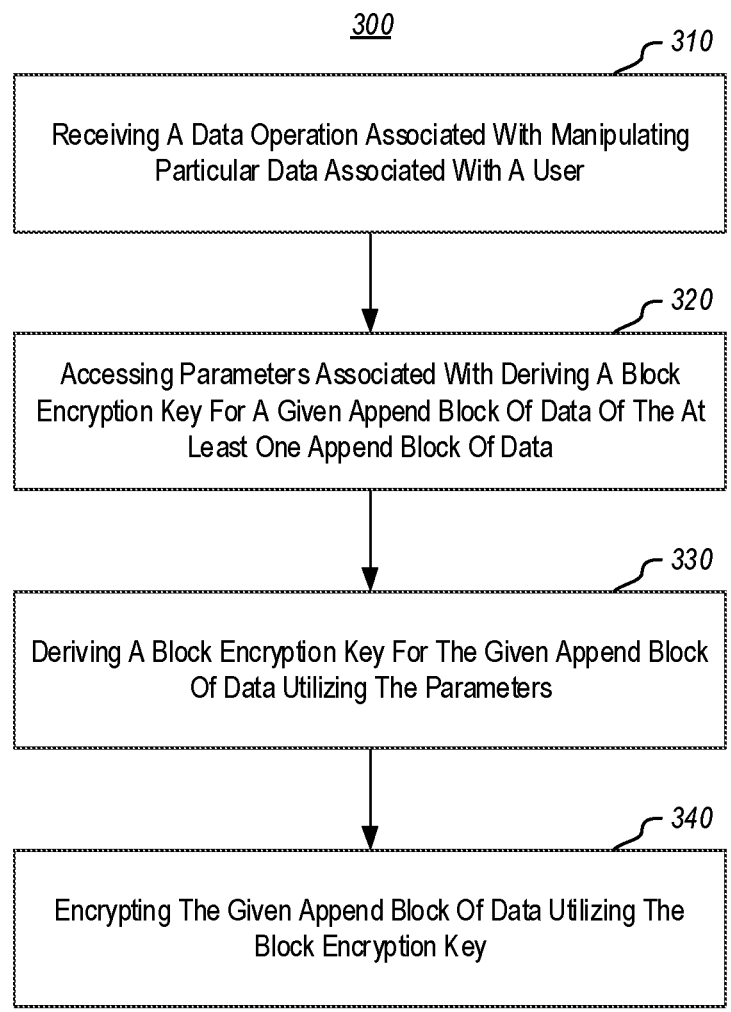
FIG. 3 illustrates a flowchart of a method for deriving a block encryption key and using the derived block encryption key to encrypt data within an append block.

FIG. 3 illustrates a method 300 for encrypting data using a block encryption key (BEK) derived from a DEK. The method may include receiving a data operation associated with manipulating particular data associated with a user (Act 310). The particular data may comprise at least one append block of data (i.e., a smallest unit written to the data lake service 222). For instance, user computer system 210A may have requested to write data to data lake service 222. In response to the received data operation, for each append block of data of the at least one append block of data, each of the method steps of the method 300 may be performed.

For instance, for each append block of data and in response to the received data operation, the method 300 may include accessing one or more key derivation parameters associated with deriving a block encryption key for a given append block of data (Act 320). Such key derivation parameters may include one or more of a DEK of a given user, a GUID (or other unique identifier) of the extent of the given append block, an append block number (e.g., an offset that can be used to identify a particular append block within an extent), and any other header information of the DEK and/or the append block to be authenticated. The method 300 may also include generating a random key derivation nonce (KDN). For instance, a random key derivation nonce may be randomly generated for each append block of data to be encrypted. As such, the generated key derivation nonce may be included in the key derivation parameters accessed to derive a block encryption key.

The method 300 may further include deriving a block encryption key for the given append block utilizing the one or more accessed key derivation parameters (Act 330). For instance, deriving the BEK may include using the DEK of the given user and a context that includes packaging of a format version of the context, algorithm identifiers that identify the algorithms to be used in performing encryption (including key lengths, if not specified by the algorithm), a GUID (or other unique identifier) of the extent associated with the append block, and the generated random key derivation nonce. Notably, many of these parameters (e.g., context format version, algorithm identifiers, and so forth) may be included within the header of a package resulting from the encryption of the DEK or in the header of the append block. In some embodiments, the derived BEK may comprise a 256-bit AES encryption key. Additionally, in some embodiments, a given BEK may not be stored at any point, but will rather be derived each time the given BEK is to be used. As such, each derived BEK may be discarded after utilizing the BEK to encrypt a given append block of data.

The method 300 may further include encrypting the given append block of data utilizing the block encryption key (Act 340). For instance, ciphertext and a message authentication code (MAC) associated with the data within the given append block may be generated using the BEK. In a more specific example, the ciphertext and MAC may be determined using the AES-GCM encryption scheme with the BEK, a nonce of all zeros (which is the first type of nonce, that is a nonce provided to AES-GCM, rather than a key derivation nonce), and potentially, AAD that comprises header information of the DEK and/or header information of the append block to authenticate as parameters. Notably, such ciphertext may comprise the encrypted, and unreadable, data (e.g., encrypted/encoded plaintext), while the MAC may comprise a sequence of bits (e.g., 128 bits) that is based on both the data that is being encrypted, as well as the derived BEK. The method 300 may further include outputting the generated key derivation nonce, the generated ciphertext, and the generated MAC. Accordingly, once the ciphertext and the MAC associated with a given append block have been generated (i.e., in association with encrypting the given append block), the ciphertext and the MAC may both be outputted. Additionally, the key derivation nonce, the ciphertext, and the MAC may be stored by the data lake service for further use.

Figure 4:
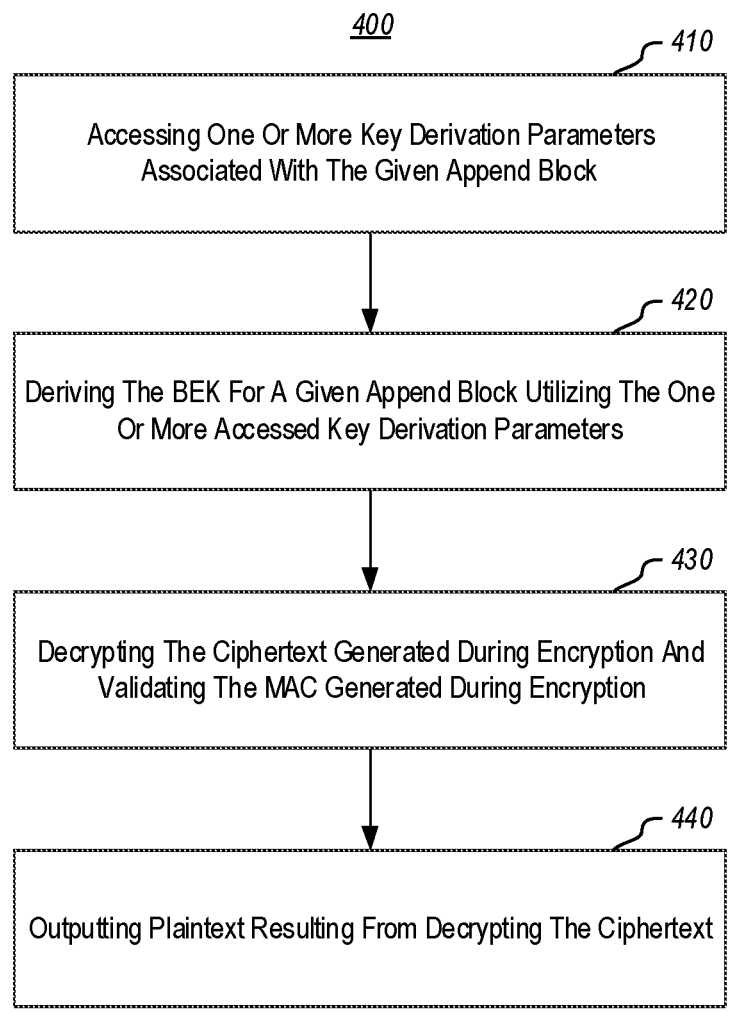
FIG. 4 illustrates a flowchart of a method for deriving a block encryption key and using the derived block encryption key to decrypt data within an append block.

FIG. 4 illustrates a method 400 for decrypting data associated with a given append block using a BEK derived from a DEK. The method 400 may include accessing one or more key derivation parameters associated with the given append block (Act 410). Such key derivation parameters may include one or more of a DEK of a given user, a GUID (or other unique identifier) of a given extent, the key derivation nonce generated during encryption, the ciphertext generated during encryption, the MAC generated during encryption, and any other header information of the DEK and/or the append block to be authenticated. The method 400 may further include deriving the BEK for a given append block utilizing the one or more accessed key derivation parameters (Act 420). For instance, deriving the BEK may include using the DEK associated with the given block, a context that includes packaging of a context format version, algorithm identifiers (including key lengths, if not specified by the algorithm), a GUID (or other unique identifier) of the extent associated with the append block, and the key derivation nonce generated during encryption.

The method 400 may also include decrypting the ciphertext generated during encryption and validating the MAC generated during encryption (Act 430). For instance, decrypting the ciphertext and validating the MAC may be performed using the derived BEK, a nonce of all zeros (which again is the first type of nonce, that is a nonce that is provided to AES-GCM, rather than a key derivation nonce), and AAD (i.e., header information to validate). The method may further include outputting plaintext resulting from decrypting the ciphertext (Act 440). Notably, in some embodiments, the MAC is to be validated before any portion of the decrypted data (e.g., the plaintext) is outputted for further use.

In this way, a BEK (block encryption key) may be generated that can greatly improve security of data (e.g., data stored within a data lake service), while keeping performance (e.g., of the data lake service) high. Additionally, generating BEK's in this way may allow for decoupling customer keys (e.g., DEK's) used for deriving encryption keys and system keys (e.g., BEK's) that are used for performing the actual encryption. Decoupling customer keys and system keys may allow for greater protection of both keys (i.e., both the DEK and the BEK), while also allowing for greater protection of encrypted data.

Furthermore, BEK's may be discarded after use, thus making it even more difficult for an attacker to gain access to encryption keys (i.e., BEK's), as an attacker would have to be able to derive encryption keys. Randomly generated nonces that are used as inputs for deriving encryption keys may further allow for greater protection against an attacker being able to derive encryption keys. Finally, encryption and key derivation, as described herein, may be performed in either hardware or software, thus allowing the principles described herein to be implemented in a wide range of environments.

Although the subject matter has been described in language specific to structural features and/or methodological acts, it is to be understood that the subject matter defined in the appended claims is not necessarily limited to the described features or acts described above, or the order of the acts described above. Rather, the described features and acts are disclosed as example forms of implementing the claims.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed:

1. A computer system comprising:
one or more processors; and
one or more computer-readable storage devices having stored thereon computer-executable instructions that are executable by the one or more processors to cause the computer system to encrypt data using a derived block encryption key for each of at least one append blocks of data, the computer-executable instructions including instructions that are executable to cause the computer system to perform at least the following:
receive a data operation associated with manipulating particular data associated with a user, the particular data comprising a plurality of append blocks of data; and
in response to the received data operation, for each append block of data of the plurality of append blocks of data, perform at least the following:
generating a random key derivation nonce;
accessing parameters associated with deriving a block encryption key for the each append block of data, the parameters comprising at least a data encryption key associated with the user, an append block number identifying an offset of the block in an extent, the generated random key derivation nonce, and a unique identifier of the extent associated with the each append block of data;
deriving the block encryption key for the each append block of data utilizing the accessed parameters, deriving the block encryption key including ensuring that the block encryption key for the each append block of data is unique; and encrypting the each append block of data utilizing the derived block encryption key for the each append block, encrypting the each append block including generating a ciphertext and a message authentication code using the block encryption key.

2. The computer system of claim 1, wherein the data operation associated with manipulating particular data associated with the user comprises at least one of a write operation or a read operation.

3. The computer system of claim 2, wherein the write operation or the read operation is to be performed with respect to a data lake service.

4. The computer system of claim 3, wherein the parameters also include one or more of a context that includes packaging of a context format version and a unique identifier of an extent associated with the given append block.

5. The computer system of claim 1, wherein an append block of data comprises a smallest unit of data written to the computer system in an atomic operation.

6. The computer system of claim 1, wherein the block encryption key is derived using NIST SP800-108 key derivation function.

7. The computer system of claim 1, wherein the block encryption key is discarded after encrypting the given append block.

8. The computer system of claim 1, wherein the block encryption key is newly derived when decrypting the given append block of data.

9. A method, implemented at a computer system that includes one or more processors, for encrypting data using a derived block encryption key for each of at least one append blocks of data, comprising:

receiving a data operation associated with manipulating particular data associated with a user, the particular data comprising a plurality of append blocks of data; and in response to the received data operation, for each append block of data of the plurality of append blocks of data, performing at least the following:

generating a random key derivation nonce;

accessing parameters associated with deriving a block encryption key for the each append block of data, the parameters comprising at least a data encryption key associated with the user, an append block number identifying an offset of the block in an extent, the generated random key derivation nonce, and a unique identifier of the extent associated with the each append block of data;

deriving the block encryption key for the each append block of data utilizing the accessed parameters, deriving the block encryption key including ensuring that the block encryption key for the each append block of data is unique; and encrypting the each append block of data utilizing the derived block encryption key for the each append block, encrypting the each append block including generating a ciphertext and a message authentication code using the block encryption key.

10. The method of claim 9, wherein the data operation associated with manipulating particular data associated with the user comprises at least one of a write operation or a read operation.

11. The method of claim 10, wherein the write operation or the read operation is to be performed with respect to a data lake service.

12. The method of claim 11, wherein the parameters also include one or more of a context that includes packaging of a context format version and a unique identifier of an extent associated with the given append block.

13. The method of claim 9, wherein an append block of data comprises a smallest unit of data written to the computer system in an atomic operation.

14. The method of claim 9, wherein the block encryption key is derived using NIST SP800-108 key derivation function.

15. The method of claim 9, further comprising discarding the block encryption key after encrypting the given append block.

16. The method of claim 9, wherein the block encryption key is newly derived when decrypting the given append block of data.

17. The method of claim 9, further comprising outputting ciphertext associated with the given encrypted append block of data.

18. A computer program product comprising one or more hardware storage devices having stored thereon computer-executable instructions that are executable by one or more processors of a computer system to encrypt data using a derived block encryption key for each of at least one append blocks of data, the computer-executable instructions including instructions that are executable to cause the computer system to perform at least the following:

receive a data operation associated with manipulating particular data associated with a user, the particular data comprising a plurality of append blocks of data; and in response to the received data operation, for each append block of data of the plurality of append blocks of data, perform at least the following:

generating a random key derivation nonce;

accessing parameters associated with deriving a block encryption key for the each append block of data, the parameters comprising at least a data encryption key associated with the user, an append block number identifying an offset of the block in an extent, the generated random key derivation nonce, and a unique identifier of the extent associated with the each append block of data;

deriving the block encryption key for the each append block of data utilizing the accessed parameters, deriving the block encryption key including ensuring that the block encryption key for the each append block of data is unique; and encrypting the each append block of data utilizing the derived block encryption key for the each append block, encrypting the each append block including generating a ciphertext and a message authentication code using the block encryption key.

* * * * *